United States Patent [19]

McKinney et al.

[11] Patent Number: 4,515,846

[45] Date of Patent: May 7, 1985

[54] POLYURETHANE BACKED CARPET FORMED WITH TWO CATALYSTS

[75] Inventors: Linda M. McKinney; Osborne K. McKinney, both of Lake Jackson, Tex.

[73] Assignee: The Dow Chemical Company, Midland, Mich.

[21] Appl. No.: 598,106

[22] Filed: Apr. 9, 1984

[51] Int. Cl.$^3$ .................. B32B 3/02; B32B 33/00
[52] U.S. Cl. .................... 428/95; 428/97; 428/921; 524/409
[58] Field of Search ............ 428/95, 96, 97, 921; 524/409

[56] References Cited

U.S. PATENT DOCUMENTS

| | | | |
|---|---|---|---|
| 3,402,192 | 9/1968 | Haluska | 260/448.2 |
| 3,518,288 | 6/1970 | Haluska | 260/448.2 |
| 3,519,526 | 7/1970 | Carey et al. | 161/67 |
| 3,637,541 | 1/1972 | Rossmy | 260/2.5 AH |
| 3,664,863 | 5/1972 | Dijkhuizen et al. | 117/161 KP |
| 3,706,681 | 12/1972 | Bachura | 260/2.5 AH |
| 3,730,822 | 5/1973 | Lovell et al. | 161/66 |
| 3,755,212 | 8/1973 | Dunlap et al. | 260/2.5 BD |
| 3,772,224 | 11/1973 | Marlin et al. | 260/2.5 BD |
| 3,821,067 | 6/1974 | Taylor et al. | 161/67 |
| 3,821,130 | 6/1974 | Barron et al. | 260/2.5 BD |
| 3,836,560 | 9/1974 | Prokai et al. | 260/448.8 R |
| 3,849,156 | 11/1974 | Marlin et al. | 117/10 |
| 3,862,879 | 1/1975 | Barron et al. | 161/159 |
| 3,882,191 | 5/1975 | Balatoni et al. | 260/859 PV |
| 3,887,500 | 6/1975 | Prokai et al. | 260/2.5 AH |
| 3,895,149 | 7/1975 | Sheffler et al. | 428/94 |
| 3,931,429 | 1/1976 | Austin | 428/158 |
| 3,947,386 | 3/1976 | Prokai et al. | 260/2.5 AH |
| 4,022,941 | 5/1977 | Prokai et al. | 427/358 |
| 4,035,440 | 7/1977 | Khanna et al. | 260/859 R |
| 4,035,529 | 7/1977 | Meisert et al. | 427/244 |
| 4,041,019 | 8/1977 | McGraw et al. | 260/75 NC |
| 4,230,755 | 10/1980 | Morris | 428/95 |

*Primary Examiner*—Marion E. McCamish
*Attorney, Agent, or Firm*—J. G. Carter

[57] ABSTRACT

Polyurethane backed carpet prepared from a urethane-forming composition containing a catalyst composition containing at least one conventional catalyst and at least one delayed action heat activated catalyst results in a carpet having an improvement in at least one of tack-free time, edge curl and tuft lock.

10 Claims, No Drawings

4,515,846

POLYURETHANE BACKED CARPET FORMED WITH TWO CATALYSTS

BACKGROUND OF THE INVENTION

The present invention concerns polyurethane backed carpets wherein the backing composition contains a thermoplastic polymer incorporated therein.

Synthetic based carpets backed with polyurethane generally have a tendency to undergo curling at their periphery when moisture or certain organic solvents are absorbed.

This edge curl phenomenon is believed to pertain directly to the back stitch loops of the carpet fibers that are firmly encapsulated with the polyurethane backing material. Certain carpet fibers, such as nylon, are highly sensitive to moisture and organic solvents, yet their back stitch loops are the high strength member of the system. The polypropylene primary backing, which is impervious to moisture, is the high tension member of the system. When the surface fibers and/or back stitch loops absorb moisture or organic solvents present in installation adhesives, the loops tend to swell or enlarge. Collectively, the enlarged loops create a bending moment that is perpendicular to the primary backing and subsequently the carpet curls at its periphery and in extreme cases, buckles. However, in accordance with the present invention, woven synthetic, particularly polypropylene, primary backed carpets are provided with an improvement in one or more of its properties such as tack-free time, edge curl performance or tuft lock by incorporating minor amounts of a thermoplastic polymer of one or more ethylenically unsaturated monomers into a urethane forming composition.

SUMMARY OF THE INVENTION

The present invention pertains to an improvement in a primary backed carpet substrate backed with, as a secondary backing, a urethane composition prepared from a composition comprising one or more polyols, one or more polyisocyanates, one or more catalysts and optionally one or more fillers and/or thermoplastic polymers; wherein the improvement comprises employing as the catalyst therefor a combination consisting of at least one delayed action, heat activated catalyst which exhibits a tack-free time of not greater than about 8 minutes and at least one conventional catalyst which exhibits a tack-free time of greater than about 8 minutes and which provides a viscosity for a mixture of the catalyst, polyol, isocyanate and filler and/or thermoplastic polymers, if present, or less than about 20000 cps in 5 to 6 minutes (300–360 s) at 37°–42° C. so as to provide an improvement in at least one of the properties selected from tack-free time, edge curl and tuft lock.

The tack-free time is determined by "finger contact" utilizing a polypropylene glove. After the samples are placed in the oven to cure they are finger-touched at 1 to 2 minute (60–120 s) intervals for tack. Any up-take of material onto the glove is considered to be indicative of excessive tackiness. If there is no up-take of material the system is considered tack free and the time it takes to achieve this quality is noted.

Another aspect of the present invention pertains to a carpet backing formulation which comprises (A) a polyol composition comprising
  (1) at least one relatively high molecular weight polyether polyol having an average hydroxyl functionality from 2 to about 8, preferably from about 2 to about 3 and an average hydroxyl equivalent weight of from about 500 to about 2200, preferably from about 600 to about 2000;
  (2) at least one relatively low molecular weight polyol having an average hydroxyl functionality of from about 2 to about 8, preferably from about 2 to about 3 and having an average hydroxyl equivalent weight of from about 31 to about 230, preferably from about 31 to about 200;
(B) at least one polyisocyanate, polyisothiocyanate or mixture thereof;
(C) a catalyst composition consisting of
  (1) at least one delayed action heat activated urethane catalyst which exhibits a tack-free time of not greater than about 8 minutes (480 s) and
  (2) at least one conventional urethane catalyst which exhibits a tack-free time of greater than about 8 minutes (480 s) and which provides a viscosity of less than about 20000 cps in 5–6 minutes (300–360 s) at 37°–42° C.; and optionally
(D)
  (1) one or more thermoplastic polymers prepared by polymerizing one or more ethylenically unsaturated monomers; and/or
  (2) one or more inorganic filler materials; and wherein
  (i) components (A-1) and (A-2) are employed in quantities which provides a hydroxyl equivalent ratio of (A-1):(A-2) of from about 0.8:1 to about 5.5:1, preferably from about 0.8:1 to about 4:1;
  (ii) component (A) is present in a quantity of from about 25 to about 45, preferably from about 28 to about 36 percent by weight based upon the combined weight of components (A) and (D);
  (iii) component (C-1) is employed in a quantity which provides from about 0.5 to about 2, preferably from about 0.75 to about 1.5, parts of catalyst per one hundred parts by weight of component (A);
  (iv) component (C-2) is employed in a quantity which provides from about 0.005 to about 0.1, preferably from about 0.01 to about 0.075 part per one hundred parts by weight of component (A);
  (v) component (D-1) is present in quantities of from about zero to about 25, preferably from about 1 to about 10 percent by weight based upon the combined weight of components (A) and (D);
  (vi) component (D-2) is employed in quantities of from zero to about 75, preferably from about 60 to about 70 percent by weight of the combined weight of components (A) and (D); and
  (vii) components (A) and (B) are present in quantities which provides an NCX:OH equivalent ratio of from about 0.95:1 to about 1.5:1, preferably from about 1:1 to about 1.25:1 and X is oxygen and/or sulfur.

DETAILED DESCRIPTION OF THE INVENTION

Suitable relatively high molecular weight polyether polyols which can be employed in the present invention include adducts of one or more compounds containing 2 to 8 hydroxyl groups per molecule and one or more hydrocarbylene or halogen substituted hydrocarbylene oxides.

Suitable hydroxyl-containing compounds include those having from about 2 to about 20, preferably from about 2 to about 6, carbon atoms such as, for example, water, ethylene glycol, diethylene glycol, propylene glycol, 1,2-butane diol, 1,3-butane diol, 1,4-butane diol, glycerine, trimethylol propane, p,p′-isopropylidine diphenol, mixtures thereof and the like.

Suitable hydrocarbylene or halogen substituted hydrocarbylene oxides which can be employed to prepare polyether polyols include those having from 2 to about 12, preferably from 2 to about 4, carbon atoms such as, for example, ethylene oxide, propylene oxide, 1,2-butylene oxide, 2,3-butylene oxide, styrene oxide, epichlorohydrin, epibromohydrin, 3-methyl-1,2-butylene oxide, 3,3-dimethyl-1,2-butylene oxide, mixtures thereof and the like.

Other relatively high molecular weight polyols which can be employed herein include polymer-containing polyols such as, for example, those disclosed in U.S. Pat. Nos. RE. 29,118 (Stamberger), RE. 28,715 (Stamberger), RE. 29,014 (Pizzini et al), 3,869,413 (Blankenship et al), U.S. Pat. No. 4,390,649 (Hoffman et al) and U.S. Pat. No. 4,394,491 (Hoffman) all of which are incorporated herein by reference.

Suitable low molecular weight polyols include, for example, ethylene glycol, propylene glycol, 1,3-propane diol, 1,4-butane diol, 1,6-hexane diol, dipropylene glycol, diethylene glycol, triethylene glycol, tetraethylene glycol, tripropylene glycol, tetrapropylene glycol, heptapropylene glycol, mixtures thereof and the like.

Also suitable as low molecular weight polyols are adducts of initiator compounds having from 2 to about 8 active hydrogen atoms per molecule and a hydrocarbylene oxide as hereinbefore described so long as the resultant adduct has the desired equivalent weight for the low equivalent weight polyol.

Particularly suitable initiator compounds include, for example, water, ethylene glycol, propylene glycol, glycerine, trimethylol propane, aniline, ammonia, ethylene diamine, diethylenetriamine, aminoethylethanol amine, pentaerythritol, glucose, fructose, sucrose, sorbitol, mixtures thereof and the like.

When adducts of initiator compounds having more than about 8 active hydrogen atoms per molecule are employed, they must be employed in admixture with polyols having less than about 8 hydroxyl groups per molecule in quantities so as to result in an average of from 2 to about 8 hydroxyl groups per molecule.

Suitable organic polyisocyanates include, for example, 2,4-toluenediisocyanate, 2,6-toluenediisocyanate, xylylenediisocyanate, p,p′-diphenylmethanediisocyanate, p-phenylenediisocyanate, naphthalenediisocyanate, dianisodine diisocyanate, polymethylene polyphenylisocyanate, hexamethylenediisocyanate, mixtures thereof and the like.

Also suitable are the isocyanate terminated prepolymers prepared from one or more of the above mentioned polyisocyanates and one or more of the above mentioned polyols.

Suitable also are the trimerized diisocyanates and crude diisocyanates.

Also suitable are the corresponding polyisothiocyanates, including isothiocyanate terminated prepolymers.

Suitable conventional catalysts which can be employed include, for example, tertiary amines, organometallic compounds, particularly metal carboxylates, mixtures thereof and the like.

Particularly suitable conventional catalysts include, for example, di-n-butyl tin-bis(mercaptoacetic acid isooctyl ester), dimethyl tin dilaurate, dibutyl tin dilaurate, stannous octoate, lead octoate, triethylenediamine, N-methyl morpholine, zinc octoate, zinc laurate, zinc stearate, mixtures thereof and the like.

Suitable delayed action, heat activated catalysts which can be employed herein include, for example, metal salts of carboxylic acids, acid salts of amines, imidazole derivatives or mixtures thereof.

Particularly suitable metal salts of carboxylic acids include those represented by the formulas

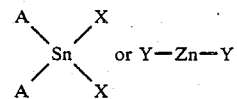

wherein each A is independently an aromatic group or saturated or unsaturated aliphatic or cycloaliphatic group, aryl group or alkyl group having from up to about 12, preferably less than about 7 carbon atoms, each X is independently a group represented by the formula

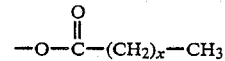

each Y is independently selected from a group represented by the formula

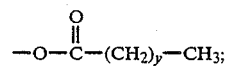

and x and y each has a value of at least about 14, preferably from about 16 to about 30, most preferably from about 16 to about 22.

Particularly suitable delayed action catalysts include, for example, dimethyl tin distearate, zinc stearate, dibutyl tin dilinoleate, or mixtures thereof.

Particularly suitable acid salts of amines include, for example, those represented by the formula

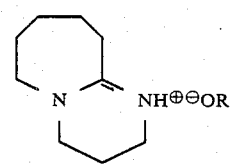

wherein R is a hydrocarbyl group having up to about 12, preferably less than about 6 carbon atoms. Suitable such compounds include, for example, 1,8-diaza-bicyclo(5,4,0)undecene-7(DBU), DBU·phenolate, DBU·2-ethylhexoate, DBU·formate, DBU·p-toluene sulfonate commercially available from Abbott Laboratories as Polycat DBU, Polycat SA-1, Polycat SA-102, Polycat SA-610/50, Polycat SA-501 or mixtures thereof.

Particularly suitable imidazole derivatives include, for example, those represented by the formulas

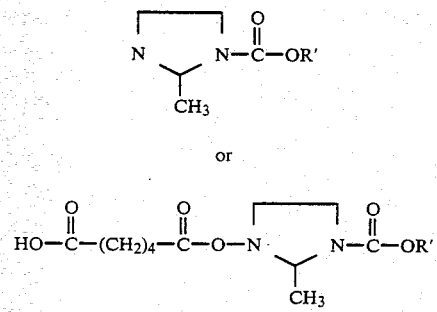

wherein each R' is a hydrocarbyl group having up to about 12, preferably less than about 7 carbon atoms. Particularly suitable imidazole derivatives include, for example, t-butyl imidazole-N-carboxylate, 1-carbobenzoxyimidazole, mixtures thereof and the like.

Suitable thermoplastic polymers which can be employed herein include those polymers prepared from one or more polymerizable ethylenically unsaturated monomers, said polymer having a density of from about 0.75 to about 1.60, preferably from about 0.90 to about 1.3 g/cc; a melt index of from about 0.1 to about 50 g/10 min., preferably from about 1.0 to about 20 g/10 min. for non-chlorinated thermoplastics or a MeH viscosity of from about 15,000 to about 30,000 poises preferably from about 17,500 to about 25,000 poises for chlorinated thermoplastics; a flexural modulus of from about 5,000 to about 300,000 psi (68.9 to 689 MPa) and an average particle size of from about 5 to about 150 microns.

Particularly suitable thermoplastic polymers include, for example, chlorinated polyethylene, ethylene-acrylic acid interpolymers, ethylene carbon monoxide interpolymers, high density polyethylene, linear low density polyethylene, low density polyethylene, ethylenebutene interpolymers, ethylene-2-methylpentene interpolymers, ethylene-hexene interpolymers, ethylene-octene interpolymers, polypropylene, ethylene-vinyl acetate interpolymers, ethylene-methyl acrylate interpolymers, ethylene-methacrylic acid interpolymers, ethylene-methyl methacrylate interpolymers, ethylene-ethyl acrylate interpolymers, ethylene-acrylic acid-carbon monoxide interpolymers, ethylene-acrylic acid-vinyl acetate interpolymers, mixtures thereof and the like.

Suitable inorganic fillers which can be employed herein includes, for example, alumina trihydrate, calcium carbonate, talc, calcium sulfate, aluminum silicate, kaolin, silicon dioxide, bentonite, mixtures thereof and the like.

The urethane backing compositions may also contain, if desired, dyes, pigments, fire retardant agents, foaming agents, silicone surfactants, combinations thereof and the like.

The following examples are illustrative of the invention, but are not to be construed as limiting the scope thereof in any manner.

GLOSSARY OF TERMS php = parts per hundred parts polyol.
doctor = to spread a puddle of froth or mixed components evenly across the width of a carpet with a draw down bar.
coating weight = the weight of the foam that is applied to the carpet.
greige weight = the weight of fibers and primary backing.
tuft lock = the amount of force needed to pull a tuft of carpet fiber from the foam backing.
index = the ratio of isocyanate equivalents to hydroxyl equivalents multiplied by 100.
primary backing = the material through which the carpet fibers are tufted.

GENERAL PROCEDURE

To a 400 ml tripour cup, 100 grams of the desired polyol mixture was added. The appropriate amount of filler was then added to the polyol mixture and admixed for 2 minutes (120 s) using a high speed stirrer. Based on the desired index, the effective amount of isocyanate was added and mixed until the uncatalyzed composition reached ~93° F. (~34° C.). The catalysts were then added and mixed. The catalyzed mixture was then "doctored" onto the back of the carpet within 45 seconds from the time the catalyst was administered and allowed to cure for about 8 minutes (420 s) at 100°–120° C.

The following procedures were employed to determine the properties of the urethane backed carpet or reaction mixtures.

Viscosity Measurement of the Reacting Composite

The viscosity and resultant reaction time to reach 20,000 centipoise was measured by using a Brookfield LVT Synchro-Lectric Viscometer with a #4 spindle rotating at 6 revolutions per minute.

Determination of Coating Weight

A 6.75"×6.75" (17.145 cm×17.145 cm) square was cut from the carpet sample and weighed to the nearest 0.1 gram. This weight minus the greige weight of the carpet specimen was the actual coating weight in oz./yd².

Determination of Tuft Lock

In this test, (Federal Test Method Standard DFL-22), the carpet sample was cut into a 2"×6" (5.08 cm×15.24 cm) sample and mounted in the load sensing jaw of a tensile testing machine such as an Instron. A metal hook was placed in the traveling jaw of the Instron and one tuft was carefully hooked. The sample was pulled at the rate of ten inches per minute (0.42 cm/s) and the force necessary to pull the tuft out of the carpet was measured in pounds. Five tufts were pulled from each carpet sample and averaged.

Determination of Moisture Edge Curl

Moisture edge curl was determined by thoroughly saturating a 6"×2" (15.24 cm×5.08 cm) urethane backed sample with water and placing the sample, backing down on a flat surface. A heavy weight was used to hold the first 2 inches (5.08 cm) of the test specimen firmly down on the surface. The sample was left undisturbed for 90 minutes (5400 s). After this time, the extent of curl or the distance from the flat surface to the back side of the outer edge of the carpet was measured in centimeters. Because edge curl is a function of time, it is pertinent that all measurements be taken at the specified time.

Determination of Adhesive Edge Curl

A 2"×6" (5.08 cm×15.24 cm) sample of carpet cut in the warp direction was covered on the backing side with a polyethylene film of equivalent dimensions. The carpet was then positioned face-up on a 2"×8"×7/16" (5.08 cm×20.32 cm×1.1 cm) piece of transite so that 2 inches (5.08 cm) was extended over the end of the transite. Masking tape was used to secure the carpet to the transite. The polyethylene film was pulled back to expose the backing. Adhesive was applied to the urethane backing after which the backing was immediately covered with the polyethylene film. After 4 hours (14400 s), the distance of the end of the carpet above the transite planar surface was measured in centimeters.

Determination of Toluene Edge Curl

The toluene edge curl test was developed to measure the actual amount of curl a urethane backing can experience when saturated with toluene, a solvent in many adhesives. In this test a 2"×6" (5.08 cm×15.24 cm) carpet sample was placed backing side down on a flat surface. The sample was then saturated with toluene and left undisturbed for 30 minutes (1800 s). After this time, the extent of curl or the actual distance from the flat surface to the outer edge of the carpet sample was measured in centimeters.

Determination of Tack

The relative tackiness and embossability of the urethane backing systems was determined by "finger contact" utilizing a polypropylene glove. After the samples were placed in the oven to cure they were finger-touched at 1 to 2 minute (60–120 s) time spans for tack. Any up-take of material onto the glove was considered to be indicative of excessive tackiness. If there was no up-take of material yet embossment occurred, the system was considered "embossable" and the time it retained this quality was noted.

The following materials were employed in the examples.

RELATIVELY HIGH MOLECULAR WEIGHT POLYOL A was an adduct of dipropylene glycol and propylene oxide. The resultant diol had an average hydroxyl equivalent weight of about 1000.
RELATIVELY LOW EQUIVALENT WEIGHT POLYOL A was dipropylene glycol having an average hydroxyl equivalent weight of about 67.
ISOCYANATE A was an 80/20 mixture of 2,4-/2,6-toluene diisocyanate having an average NCO equivalent weight of about 87.
ISOCYANATE B was a prepolymer prepared by reacting isocyanate A with dipropylene glycol in an equivalent NCO:OH ratio of about 1.25:1. The resultant prepolymer contained 28% NCO by weight and had an average NCO equivalent weight of 150.
CONVENTIONAL CATALYST A was dimethyl tin dilaurate.
DELAYED ACTION CATALYST A was dimethyl tin distearate.
FILLER A was alumina trihydrate.
FILLER B was calcium carbonate.
CARPET SUBSTRATE A was Antron brand nylon fibers weighing about 22 oz/yd$^2$ (745.8 g/m$^2$) tufted through a woven polypropylene primary backing at a rate of about 7.5 stitches per inch (2.95 stitches per cm). This greige good had a pile height of about 0.156 inches (0.396 cm), a WDF (Weight Density Factor) of about 111,000 and a greige weight of about 25 oz/yd$^2$ (847.5 g/m$^2$).
CARPET SUBSTRATE B was Antron brand nylon fibers weighing about 20 oz/yd$^2$ (678 g/m$^2$) tufted through a woven polypropylene primary backing at a rate of about 6.0 stitches per inch. This greige good had a pile height of about 0.126 inches (0.3200 cm), a WDF of about 115,000 and a greige weight of about 21 oz/yd$^2$ (712 g/m$^2$).
THERMOPLASTIC POLYMER A was a low density polyethylene homopolymer having a melt index ($I_2$) of about 1.9 and a density of about 0.9245 g/cc, a Flexural Modulus of $3.0 \times 10^4$ psi ($20.7 \times 10^4$ kPa) and an average particle size $\leq 75$ microns.
THERMOPLASTIC POLYMER B was a chlorinated polyethylene containing about 46% chlorine by weight and having a melt viscosity of about 21,000 poises and a density of about 1.28 g/cc, a Flexural Modulus of $9.5 \times 10^3$ psi ($65.5 \times 10^3$ kPa), and an average particle size $\leq 75$ microns.
THERMOPLASTIC POLYMER C was a high density polyethylene homopolymer having a melt index ($I_2$) of about 5 and a density of about 0.935 g/cc, a Flexural Modulus of about $1.9 \times 10^5$ psi ($13.1 \times 10^5$ kPa), and an average particle size $\leq 75$ microns.
THERMOPLASTIC POLYMER D was a linear low density copolymer of ethylene-1-octene containing about 8% octene-1 weight and having a melt index ($I_2$) of about 1.0 g/10 min. and a density of about 0.920 g/cc, a Flexural Modulus of about $5.9 \times 10^4$ psi ($40.7 \times 10^4$ kPa), and an average particle size $\leq 75$ microns.

A series of urethane backed carpet substrates were prepared by the general procedure. The compositions and results are given in the following table.

EXAMPLE 1

| COMPONENTS AND PROPERTIES | 1 | A | B | 2 | 3 | 4 | C |
|---|---|---|---|---|---|---|---|
| RHMW[1] POLYOL, type/pbw[2], | A/85 | A/85 | A/85 | A/85 | A/85 | A/85 | A/85 |
| equiv. | 0.085 | 0.085 | 0.085 | 0.085 | 0.085 | 0.085 | 0.085 |
| RLMW[3] POLYOL, type/pbw[2], | A/15 | A/15 | A/15 | A/15 | A/15 | A/15 | A/15 |
| equiv. | 0.224 | 0.224 | 0.224 | 0.224 | 0.224 | 0.224 | 0.224 |
| THERMOPLASTIC POLYMER, type/pbw[2] | — | — | — | — | — | — | — |
| FILLER, type/pbw[2] | A/100 | A/100 | A/100 | A/100 | A/100 | A/100 | A/100 |
|  | B/105 | B/105 | B/105 | B/105 | B/105 | B/105 | B/105 |
| CONVENTIONAL CATALYST, type/pbw[2] | A/.05 | A/0.1 | A/0.1 | A/0.01 | A/0.03 | A/0.05 | — |
| DELAYED ACTION CATALYST, type/pbw[2] | A/1.0 | — | — | A/1.0 | A/1.0 | A/1.0 | A/1.0 |
| ISOCYANATE, type/pbw[2], | B/53.4 | B/53.4 | B/53.4 | B/53.4 | B/53.4 | B/53.4 | B/53.4 |
| equiv. | 0.356 | 0.356 | 0.356 | 0.356 | 0.356 | 0.356 | 0.356 |
| INDEX (NCO:OH eqiv. ratio) | 1.15 | 1.15 | 1.15 | 1.15 | 1.15 | 1.15 | 1.15 |
| CARPET SUBSTRATE, type | A | A | B | B | B | B | B |

-continued

| | EXAMPLE 1 | | | | | | |
|---|---|---|---|---|---|---|---|
| | EXAMPLE NUMBER OR COMPARATIVE EXPERIMENT LETTER | | | | | | |
| COMPONENTS AND PROPERTIES | 1 | A | B | 2 | 3 | 4 | C |
| COATING weight, oz/yd$^2$, | 35 | 35 | 37.95 | 32.18 | 34.95 | 34.23 | 34.65 |
| g/m$^2$ | 1186.7 | 1186.7 | 1286.5 | 1090.9 | 1184.8 | 1160.4 | 1174.6 |
| TACK FREE TIME, min., | 5 | 9.5 | 11 | 6.5 | 5.25 | 5.0 | 8.0 |
| sec. | 300 | 570 | 660 | 390 | 315 | 300 | 480 |
| EDGE CURL | | | | | | | |
| Moisture, cm | 0.3 | 0.9 | N.D.$^4$ | N.D.$^4$ | N.D.$^4$ | N.D.$^4$ | N.D.$^4$ |
| Adhesive, cm | 0 | 0.5 | N.D.$^4$ | N.D.$^4$ | N.D.$^4$ | N.D.$^4$ | N.D.$^4$ |
| Toluene, cm | N.D.$^4$ | N.D.$^4$ | N.D.$^4$ | N.D.$^4$ | N.D.$^4$ | N.D.$^4$ | N.D.$^4$ |

$^1$RHMW = relatively high molecular weight
$^2$pbw = parts by weight
$^3$RLMW = relatively low molecular weight
$^4$N.D. = not determined

| | EXAMPLE 2 | | | | EXAMPLE 3 | | |
|---|---|---|---|---|---|---|---|
| | EXAMPLE NUMBER OR COMPARATIVE EXPERIMENT LETTER | | | | | | |
| COMPONENTS AND PROPERTIES | 5 | D | 6 | E | 7 | 8 | 9 |
| RHMW$^1$ POLYOL, type/pbw$^2$, | A/85 | A/85 | A/85 | A/85 | A/85 | A/85 | A/85 |
| equiv. | 0.085 | 0.085 | 0.085 | 0.085 | 0.085 | 0.085 | 0.085 |
| RLMW$^3$ POLYOL, type/pbw$^2$, | A/15 | A/15 | A/15 | A/15 | A/15 | A/15 | A/15 |
| equiv. | 0.224 | 0.224 | 0.224 | 0.224 | 0.224 | 0.224 | 0.224 |
| THERMOPLASTIC POLYMER, type/pbw$^2$ | — | — | B/5 | B/5 | C/5 | A/5 | D/5 |
| FILLER, type/pbw$^2$ | A/100 | A/100 | A/90 | A/90 | A/90 | A/90 | A/90 |
| | B/105 | B/105 | B/95 | B/95 | B/95 | B/95 | B/95 |
| CONVENTIONAL CATALYST type/pbw$^2$ | A/.05 | A/0.1 | A/0.05 | A/0.1 | A/0.05 | A/0.05 | A/0.05 |
| DELAYED ACTION CATALYST, type/pbw$^2$ | A/1.0 | — | A/1.0 | — | A/1.0 | A/1.0 | A/1.0 |
| ISOCYANATE, type/pbw$^2$, | B/53.4 | B/53.4 | B/53.4 | B/53.4 | B/53.4 | B/53.4 | B/53.4 |
| equiv. | 0.356 | 0.356 | 0.356 | 0.356 | 0.356 | 0.356 | 0.356 |
| INDEX (NCO:OH equiv. ratio) | 1.15 | 1.15 | 1.15 | 1.15 | 1.15 | 1.15 | 1.15 |
| CARPET SUBSTRATE, type | A | A | A | A | A | A | A |
| COATING weight, oz/yd$^{2\,5}$, | 35.31 | 35.53 | 37.28 | 36.10 | 39.29 | 32.45 | 31.81 |
| g/m$^2$ | 1197 | 1204.5 | 1263.8 | 1223.8 | 1331.9 | 1100 | 1078.4 |
| TACK FREE TIME, min., | 5.0 | 9.5 | 5.0 | 9.0 | 5 | 5 | 4.5–5 |
| sec. | 300 | 570 | 300 | 540 | 300 | 300 | 270–300 |
| EDGE CURL | | | | | | | |
| Moisture, cm | 0.3 | 0.9 | 0 | 0.5 | 0 | 0.1 | 0.2 |
| Adhesive, cm | 0 | 0.5 | 0.2 | negative$^5$ | 0 | negative$^5$ | negative$^5$ |
| Toluene, cm | N.D.$^4$ | 0.4 | N.D.$^4$ | N.D.$^4$ | N.D.$^4$ | 0 | 0 |

$^1$RHMW = relatively high molecular weight
$^2$pbw = parts by weight
$^3$RLMW = relatively low molecular weight
$^4$N.D. = not determined
$^5$negative = dropped instead of curling upward which is better than a value of zero, i.e. negative edge curl.

We claim:

1. In a synthetic primary backed carpet substrate backed with, as a secondary backing, a urethane composition prepared from a composition comprising one or more polyols, one or more polyisocyanates, one or more catalysts and optionally one or more fillers and/or thermoplastic polymers; the improvement which comprises employing as the catalyst therefor a combination consisting of (1) at least one delayed action, heat activated catalyst which exhibits a tack-free time of not greater than about 8 minutes and (2) at least one conventional catalyst which exhibits a tack-free time of greater than about 8 minutes and which provides a viscosity for a mixture of the catalysts, polyol, isocyanate and filler and/or thermoplastic polymer, if present, of less than about 20000 cps in 5 to 6 minutes at 37°–42° C. so as to provide an improvement in at least one of the properties selected from tack-free time, edge curl and tuft lock.

2. A carpet of claim 1 wherein said synthetic primary backing is polypropylene.

3. A carpet backing formulation which comprises
(A) a polyol composition comprising
 (1) at least one relatively high molecular weight polyether polyol having an average hydroxyl functionality from 2 to about 8, preferably from about 2 to about 3 and an average hydroxyl equivalent weight of from about 500 to about 2200;
 (2) at least one relatively low molecular weight polyol having an average hydroxyl functionality of from about 2 to about 8 and having an average hydroxyl equivalent weight of from about 31 to about 230;
(B) at least one polyisocyanate, polyisothiocyanate or mixture thereof;
(C) a catalyst composition consisting of
 (1) at least one delayed action heat activated urethane catalyst which exhibits a tack-free time of not greater than about 8 minutes (480 s) and
 (2) at least one conventional urethane catalyst which exhibits a tack-free time of greater than about 8 minutes (480 s) and which provides a viscosity of less than about 20000 cps in 5-6 minutes (300-360 s) at 37°-42° C.; and optionally (D)
(1) one or more thermoplastic polymers prepared by polymerizing one or more ethylenically unsaturated monomers; and/or
(2) one or more inorganic filler materials; and wherein
  (i) components (A-1) and (A-2) are employed in quantities which provides a hydroxyl equivalent ratio of (A-1):(A-2) of from about 0.8:1 to about 5.5:1;
  (ii) component (A) is present in a quantity of from about 25 to about 45 percent by weight based upon the combined weight of components (A) and (D);
  (iii) component (C-1) is employed in a quantity which provides from about 0.5 to about 2 parts of catalyst per one hundred parts by weight of component (A);
  (iv) component (C-2) is employed in a quantity which provides from about 0.005 to about 0.1 part per one hundred parts by weight of component (A);
  (v) component (D-1) is present in quantities of from about zero to about 25 percent by weight based upon the combined weight of components (A) and (D);
  (vi) component (D-2) is employed in quantities of from zero to about 75 percent by weight of the combined weight of components (A) and (D); and
  (vii) components (A) and (B) are present in quantities which provides an NCX:OH equivalent ratio of from about 0.95:1 to about 1.5:1 and X is oxygen and/or sulfur.

4. A carpet substrate comprising a natural or synthetic fibrous material tufted through a synthetic primary backing and having a polyurethane secondary backing resulting from curing a formulation of claim 3.

5. A formulation of claim 3 wherein
  (i) components (A-1) and (A-2) are employed in quantities which provides a hydroxyl equivalent ratio of (A-1):(A-2) of from about 0.8:1 to about 4:1;
  (ii) component (A) is present in a quantity of from about 28 to about 36 percent by weight based upon the combined weight of components (A) and (D);
  (iii) component (C-1) is employed in a quantity which provides from about 0.75 to about 1.5 parts of catalyst per one hundred parts by weight of component (A);
  (iv) component (C-2) is employed in a quantity which provides from about 0.01 to about 0.075 part per one hundred parts by weight of component (A);
  (v) component (D-1) is present in quantities of from about 1 to about 10 percent by weight based upon the combined weight of components (A) and (D);
  (vi) component (D-2) is present in quantities of from about 60 to about 70 percent by weight of the combined weight of components (A) and (D); and
  (vii) component (A) and (B) are present in quantities which provides an NCX:OH equivalent ratio of from about 1:1 to about 1.25:1 and X is oxygen.

6. A carpet substrate comprising a natural or synthetic fibrous material tufted through a synthetic primary backing and having a polyurethane secondary backing resulting from curing a formulation of claim 5.

7. A formulation of claim 5 wherein component (D-1) has a density of from about 0.75 to about 1.60 g/cc, a flexural modulus of from about 5,000 to about 300,000 psi and an average particle size of from about 5 to about 150 microns.

8. A carpet substrate comprising a natural or synthetic fibrous material tufted through a synthetic primary backing and having a polyurethane secondary backing resulting from curing a formulation of claim 7.

9. A formulation of claim 7 wherein Component (D-1) is an ethylene-acrylic acid copolymer, an ethylene-carbon monoxide copolymer, a polyethylene homopolymer, an ethylene-octene-1 copolymer, a chlorinated polyethylene homopolymer or a combination thereof.

10. A carpet substrate comprising a natural or synthetic fibrous material tufted through a synthetic primary backing and having a polyurethane secondary backing resulting from curing a formulation of claim 9.

* * * * *